May 12, 1942.  F. M. PICKETT  2,282,768
COPYHOLDER FOR DOCUMENT PHOTOGRAPHING CAMERAS
Filed Aug. 3, 1940   5 Sheets-Sheet 1

Inventor
Frank M. Pickett
By
Edwin O. Blodgett
Attorneys

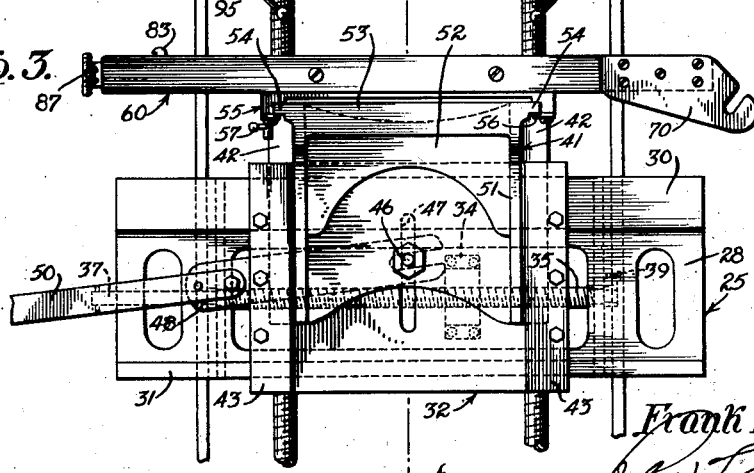

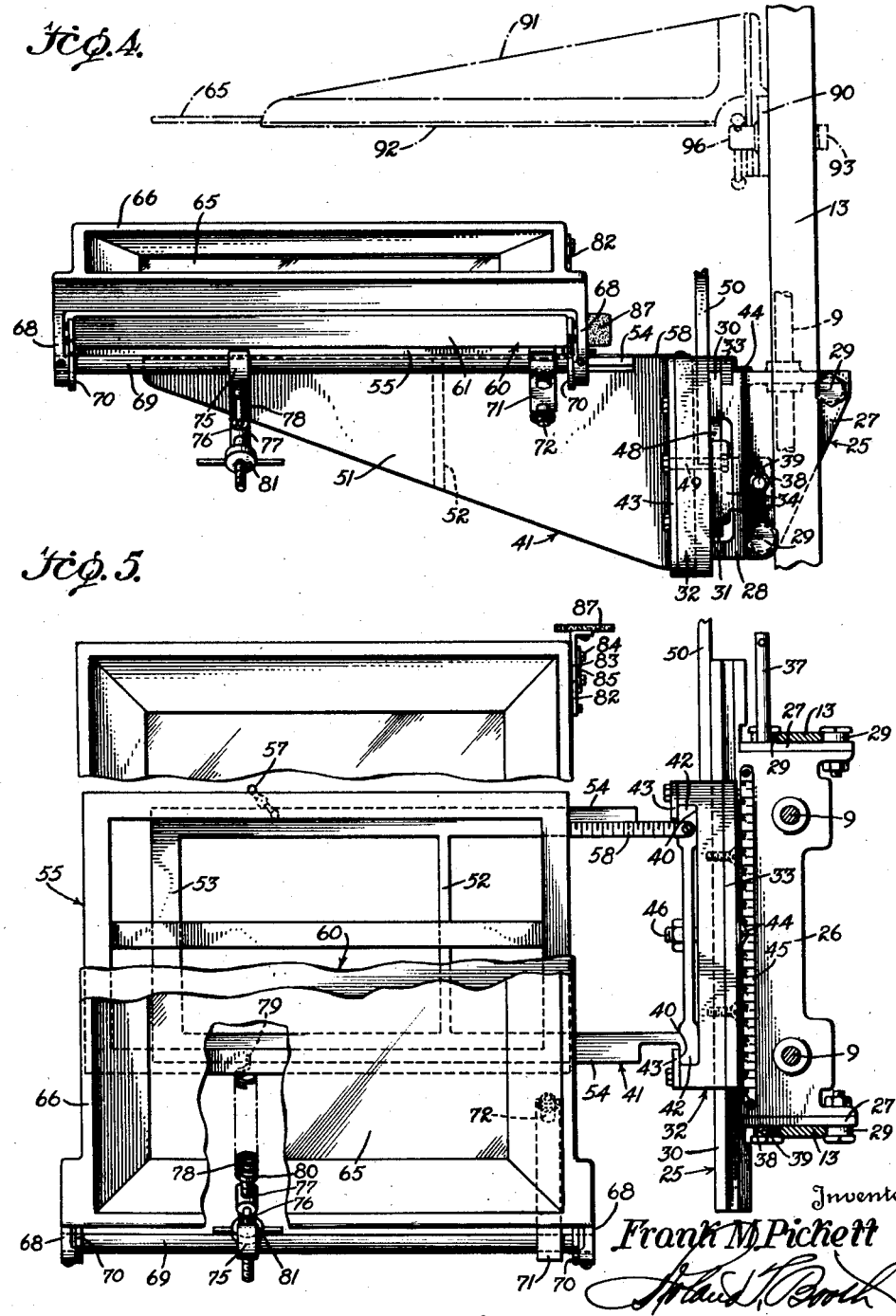

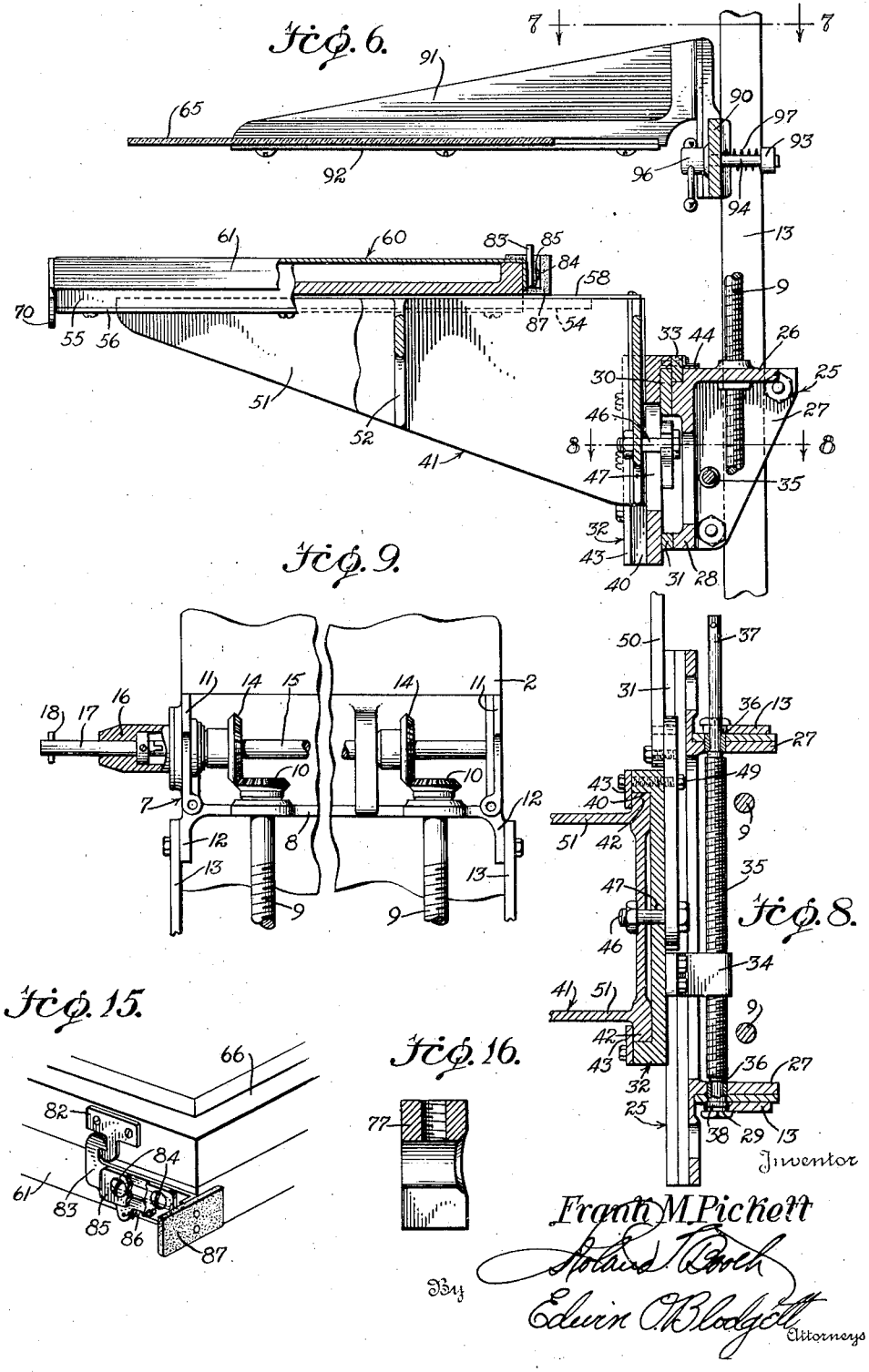

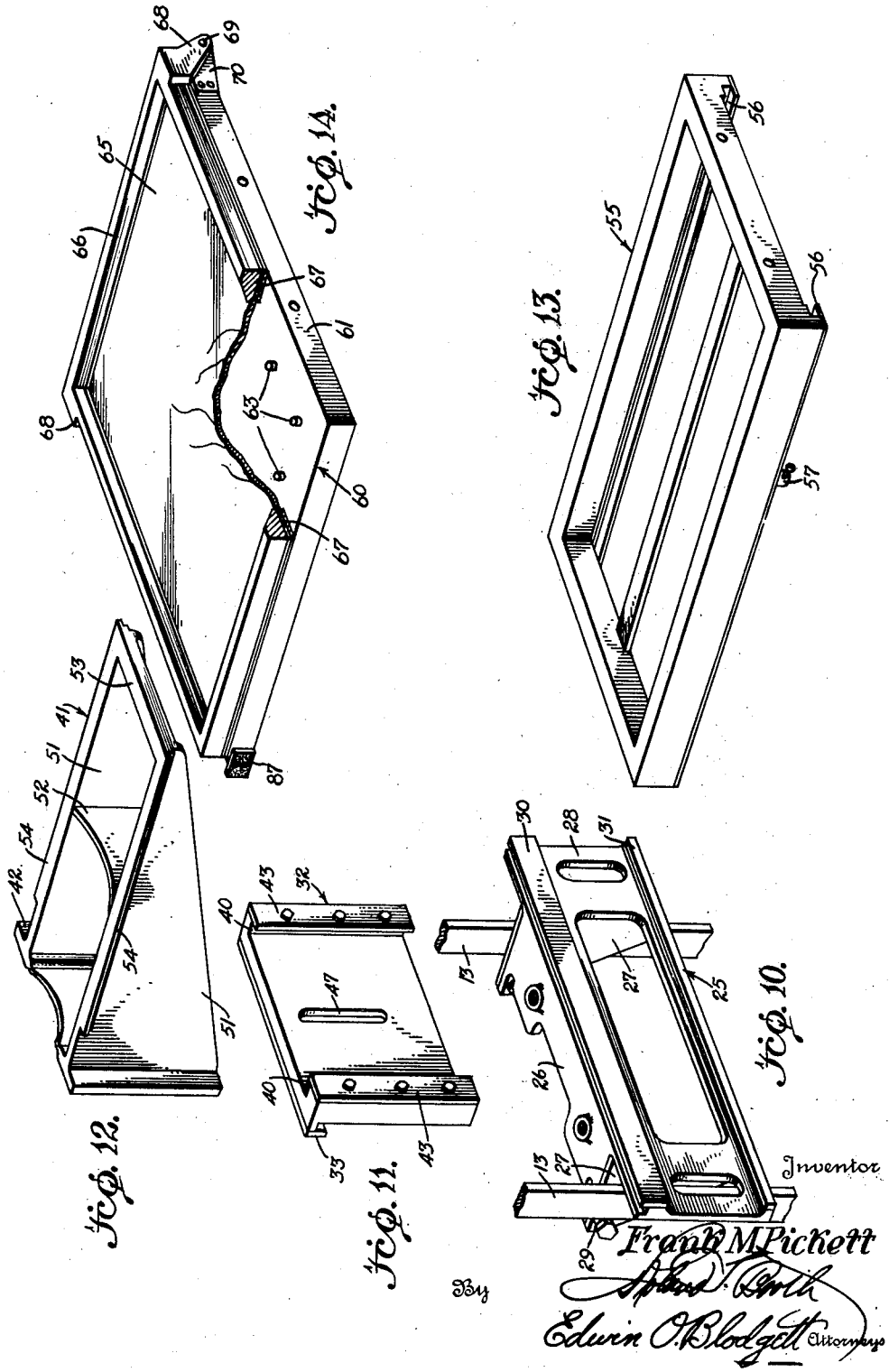

Patented May 12, 1942

2,282,768

UNITED STATES PATENT OFFICE 2,282,768

COPYHOLDER FOR DOCUMENT PHOTOGRAPHING CAMERAS

Frank M. Pickett, Darien, Conn., assignor to Remington Rand Inc., Buffalo, N. Y.

Application August 3, 1940, Serial No. 350,504

14 Claims. (Cl. 88—24)

This invention relates to copyholders and particularly to a copyholder adapted to support individual sheets, cards and books in position for making photographic copies of the printed matter thereon.

The invention comprehends the provision of a copyholder for document photographing cameras provided with a copy supporting member adjustably mounted on the camera for vertical and horizontal adjustment in three directions for supporting documents for photographic copying, so they may be held in a focusing position against a transparent focusing plate that is selectively mounted on either of two parts of the copyholder structure, one of which is adapted to facilitate the use of the copy plate for conveniently supporting books in position to have copies made of the printed pages thereof, and the other for facilitating the copying of discrete sheets, cards and similar documents.

The invention further comprehends the provision of a copyholder having a copy plate adjustable in three directions for placing the copy to be photographed in focus with the camera against a suitable transparent focusing plate, together with means for providing for the movement of the copy plate from the focusing position to a position spaced therefrom for facilitating the handling and feeding of the copies to be photographed.

The invention comprehends the provision of a copyholder having a carrier construction arranged to conveniently provide for quick adjustment of the copy plate into a position to hold copy in focus with the camera and also to facilitate the support and adjustment of a transparent focusing plate for the copy in the proper focusing position.

The invention provides a carrier construction for the copy plate so arranged that it does not interfere with the convenient manipulation of copy for placing and removing from the photographing position and also for providing for the adjustment of the copy plate in three directions in a convenient manner so the copy may be properly positioned on the sensitized sheet.

The provision of a copyholder construction that facilitates alternate photographing of documents in either separate sheet form or in bound book form is a feature of the invention.

The invention also provides for an economical carrier and supporting structure for the copy plate, as well as the focusing plate, arranged in combination to facilitate the photography of separate documents, as well as books, in an economical manner.

In the drawings:

Fig. 2 shows an enlarged detail view of the copyholder taken from a position at right angles to that shown in Fig. 1, the copyholder being arranged for photographing discrete sheets, cards or similar documents.

Fig. 3 is a view similar to Fig. 2 showing the copyholder arranged for photographing books in the manner illustrated in Fig. 1.

Fig. 4 is an enlarged side elevation of the copyholder looking at the opposite side from that shown in Fig. 1 and looking at the copyholder from the right-hand side as illustrated in Fig. 2, the copyholder being equipped for photographing discrete sheets.

Fig. 5 is a plan view of the copyholder as shown in Fig. 4, with portions broken away to illustrate details of construction.

Fig. 6 is a cross section taken substantially on line 6—6 of Fig. 3 with portions shown in elevation.

Fig. 8 is a cross section taken on line 8—8 of Fig. 6.

Fig. 9 shows the operating mechanism for the main focusing screws, portions being broken away and the cover for the housing of this mechanism being omitted.

Fig. 10 shows the main carrier in perspective and disassembled from the remaining structure of the copyholder.

Fig. 11 shows the supplemental carrier in perspective.

Fig. 12 shows the supporting frame for the copy plate holding frame in perspective.

Fig. 13 shows the copy plate holding frame in perspective.

Fig. 14 shows the copy plate and the focusing plate frame detachably mounted thereon, in perspective, with portions broken away and shown in section.

Fig. 15 is an enlarged detailed perspective showing the latch for holding the focusing plate in focusing position when it is mounted in the frame carried by the copy plate.

Fig. 16 is transverse section on an enlarged scale through the bifurcated head forming part of the structure for retaining the focusing plate frame mounted on the copy plate.

Figure 1:
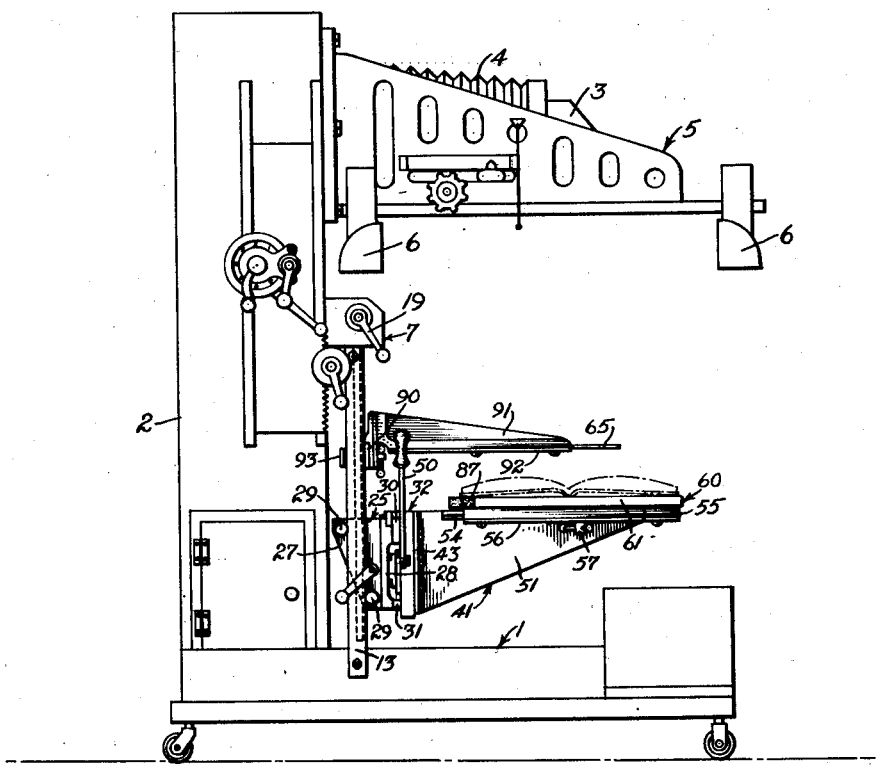
Fig. 1 shows a document photographing machine in side elevation with the copyholder of this invention applied thereto and arranged for photographing the pages of a book.

The camera ilustrated in Fig. 1 has a base 1 mounted on suitable casters and carrying the entire camera structure including housing 2 for holding sensitized paper and feeding it in a desired manner for successively taking photographs of documents. The lens unit 3 is adjustably connected to housing 2 by bellows 4 and slidably mounted on supporting structure generally indicated by the numeral 5. The lens unit is adjustable on structure 5 for movement into focus for making different sized reproductions of a document on the sensitized material in housing 2. The sizes vary in a known manner between the opposite limits of adjustment thereof. The housings for the lights to illuminate the copy to be photographed are indicated at 6.

This camera structure is well known in the art, and leaves the space below frame 5 open from three sides in order to provide for manual access to this space below the lens for positioning and holding a document so that it may be photographed and so that a plurality of documents may be conveniently and quickly inserted and removed from the photographing position.

In order to support the copy for photographing in this camera, a copyholder is provided. The present invention provides the copyholder illustrated in the drawings which is mounted below frame 5 for adjustment into different focal positions according to the adjustment of lens unit 3.

A focusing screw supporting structure 7, see Figs. 1 and 9, is mounted on housing 2 a suitable distance below frame 5 and a substantial distance above base 1. This structure comprises bottom wall 8 formed to mount bearings for rotatably supporting main focusing screws 9. Pinions 10 are rigidly secured to the upper ends of focusing screws 9 in the supporting structure above wall 8. End walls 11 are provided at the opposite ends of bottom wall 8 and have depending extensions 12 that may be integral therewith for mounting the upper ends of vertical tracks 13. Vertical tracks 13 operate in conjunction with main focusing screws 9 to support and guide the entire structure of the copyholder.

Screws 9 are operated for adjusting the copyholder by means of pinions 14 meshing with pinions 10. Shaft 15 carries pinions 14 and is rotatably mounted in suitable bearings in end walls 11. One end of shaft 15 extends outwardly beyond the end of supporting structure 7 into extension housing 16 mounted on one end wall 11 as shown in Fig. 9. An extension shaft 17 is rotatable in extension housing 16 and connected at the end in said housing to shaft 15. The other end of extension shaft 17 projects beyond the end of housing 16, the end portion carrying a pin 18.

Pin 18 is adapted to cooperate with a handle 19 for transmitting motion from said handle to rotate shaft 17 when the handle is fitted on the end of said shaft.

The supporting structure 7 shown in Fig. 9 may be covered with a suitable housing, if desired.

The lower ends of vertical tracks 13 are secured to opposite sides of base 1 as shown in Fig. 1.

A main carrier 25 has a top wall 26 formed with a pair of spaced openings threadedly receiving main focusing screws 9 for vertical adjustment of the main carrier in the rotation of screws 9. End walls 27 extend laterally from top wall 26 and front wall 28 and slidably engage the inside faces of vertical tracks 13. Guide rollers 29 are mounted on the outer faces of end walls 27 to engage opposite edges of vertical tracks 13 for supporting main carrier 25 and the copyholder structure carried thereby for movement on said tracks in a vertical direction through the operation of main focusing screws 9. Front wall 28 is provided with top and bottom guide strips 30 and 31. Top guide strip 30 forms a channel along the top of the main carrier.

A supplemental carrier 32 is mounted on main carrier 25 for horizontal sliding movement by having one face thereof slidably engage guide strips 30 and 31 in the manner illustrated in Fig. 6. A retaining strip 33 is secured to the top rear edge of carrier 32 and has the lower edge slidably engaged in the guide channel formed at the top of main carrier 25 by guide strip 30.

An adjusting head 34 is mounted on the rear face of supplemental carrier 32 as shown in Fig. 8 for threadedly receiving adjusting screw 35 journalled in bearings at 36 in end walls 27 of main carrier 25. A reduced extension 37 is formed on one end of adjusting screw 35 to project beyond the end of main carrier 25. The end of extension 37 is provided with a cross piece for manual engagement of a handle therewith to rotate adjusting screw 35 and move supplemental carrier 32 horizontally on main carrier 25 to provide for horizontal adjustment of the copy plate relative to the camera. Bearings 36 in which adjusting screw 35 is journalled, are provided with eccentrically formed heads 38 adapted to engage in seats formed in end walls 27, so that rotation thereof in the end walls will be prevented. These heads also provide means to cooperate with retaining screw 39 to effectively hold the bearings in end walls 27 against endwise movement in the rotation of the screw thereby eliminating lost motion in securing adjustment of supplemental carrier 32 horizontally. These eccentric heads also provide means whereby the bearings are held tightly by screws 39 and not by friction in walls 27 thus allowing for easy removal and assembly of adjusting screw 35.

Supplemental carrier 32 is formed to provide vertical guideways 40 on the front portion thereof for slidably receiving supporting frame 41 through having ribs 42 slidably engaged in guideways 40. Retaining plates 43 are detachably mounted on supplemental carrier 32, in the manner shown in Figs. 5 and 8, for slidably retaining ribs 42 of supporting frame 41 engaged in guideways 40.

An indicator 44 is mounted on the rear face of supplemental carrier 32, on guide strip 33 thereof, as shown in Figs. 5 and 6, for cooperation with a scale 45 mounted on top wall 26 of main carrier 25. Pointer 44 and scale 45 cooperate to register the horizontal position of adjustment of supplemental carrier 32 on main carrier 25.

Supporting frame 41 has vertical sliding movement on supplemental carrier 32. This vertical sliding movement is controlled and limited by means of bolt 46 mounted in the rear wall thereof extending through slot 47 in supplemental carrier 32. The length of the slot limits the amount of vertical sliding movement of supporting frame 41. The rear end of bolt 46 is received in the bifurcated end of operating lever 48 pivoted at 49 on supplemental carrier 32. Lever 48 has a detachable handle 50 thereon extending outwardly from one side of the document photographing machine for manual engagement and operation to raise and lower supporting frame 41 between its limits of movement in a vertical direction on supplemental carrier 32.

It will be noted in the drawings that main carrier 25 is constructed so that front wall 28 is provided with a large central opening through which adjusting head 34 extends to engage adjusting screw 35. Portions also project forwardly from front wall 28 at the upper and lower edges to support guide strips 30 and 31 a sufficient distance in advance of front wall 28 to provide space for receiving operating lever 48 and bolts 40. This provides for free operation of these parts in connection with the horizontal adjustment of supplemental carrier 32 on main carrier 25 and vertical sliding movement of supporting frame 41 on the supplemental carrier. Supporting frame 41 has spaced side portions 51 formed with inclined lower edges with the widest dimension at the rear of the frame where the side portions are integral with ribs 42 and the rear wall. Side portions 51 are connected by a central web 52 and a front cross piece 53. The substantially horizontal upper edges of supporting frame 41 are formed with outwardly projecting guide flanges 54 extending laterally beyond side portions 51 and cooperating with the upper edges of side portions 51 to slidably mount and guide copy table frame 55.

Copy table frame 55 is of rectangular form as shown in Fig. 13 and has guideways formed on the lower side portions thereof to slidably engage guide flanges 54 of supporting frame 41. Retaining strips 56 are detachably mounted on the lower side portions of copy table frame 55 for retaining it in slidable engagement with supporting frame 41. This sliding motion as shown in the drawings is in a horizontal direction at right angles to the horizontal movement of supplemental carrier 32 on main carrier 25. A clamping screw threadedly mounted in copy table frame 55 is indicated at 57, for manual operation to engage one of the guide flanges 54 at one side of supporting frame 41 to secure copy table frame 55 on supporting frame 41 in its adjusted position against accidental movement. A registering strip 58, containing a plurality of scale graduations of suitable form, see Fig. 5, is mounted on the upper edge on one side portion of supporting frame 41 to register the adjusted position of copy table frame 55 on supporting frame 41.

Copy table frame 55 is provided with a central reinforcing web as shown in Fig. 13 adapted to prevent warping of the ends of the frame.

Copy plate 60 is constructed of sheet metal with depending marginal flanges 61. Intermediate portions of the front and rear marginal flanges 61 are provided with openings to receive a suitable fastening means for securing copy plate 60 with the under surface of the plate seating on the top face of copy table frame 55 in the manner clearly shown in Figs. 2, 3, 5 and 6. Copy plate 60 has a length from front to rear substantially the same as that of copy table frame 55, the d'mension being slightly greater in order to provide for the engagement of depending flanges 61 over the outer faces of the front and rear sides of frame 55. The side portions of copy plate 60 extend a substantial distance beyond the side portions of frame 55 as shown in Figs. 2, 3 and 5. Positioning pins 63 may be provided on copy plate 60, as indicated in Fig. 14, in a suitable manner well known in the art, for positioning sheets of paper in a fixed relation on copy plate 60. These positioning pins cooperate in registering all sheets and cards photographed so their position on the sensitized strip in the camera will be uniform. These positioning pins 63 may be spring-pressed for vertical movement through copy plate 60, in a manner well known in the art, in order that a transparent glass focusing plate 65 may be moved into intimate engagement with the upper surface of sheets being photographed for holding them flat on copy plate 60 with the upper surface of a sheet in proper focus with the camera.

When it is desired to photograph single sheets, cards and the like, transparent glass focusing plate 65 is mounted in rectangular frame 66 having a size approximating that of copy plate 60. Frame 66 is positioned on top of focusing plate 65 while a thin rectangular retaining frame 67 is engaged with the bottom marginal portion of focusing plate 65. Suitable retaining screws extending into frame 66 secure focusing plate 65 thereto. At one side of the document photographing machine and copy plate 60, frame 66 is formed with a pair of outwardly and downwardly inclined supporting arms 68 having a shaft 69 extending between the free ends of said arms and rigidly mounted therein. Shaft 69 is engaged in the bearing slots formed in the ends of a pair of supporting arms 70 mounted on and projecting from the corners of copy plate 60 at one side of the machine. The bearing slots in arms 70 provide for convenient removal of frame 66 and focusing plate 65 from copy plate 60 when desired, for a purpose hereinafter described.

Shaft 69 carries an arm 71 which projects laterally therefrom under copy plate 60 as shown in Fig. 2. The end of the arm 71 mounted on shaft 69 is bifurcated to receive shaft 69 in a convenient manner while a clamping nut is threaded in the bifurcated end, in such a manner, that tightening of the nut draws the arm portions together to clamp it rigidly in fixed position on shaft 69.

The opposite end of arm 71 slidably mounts pin 72 carrying an expansion spring 73 in coiled relation thereon for engaging the flange on the free upper end of pin 72 for normally projecting said pin upwardly in arm 71 so that the retaining member on the lower end engages the bottom edge of the arm. The upper end of pin 72 is adapted to engage the under face of copy table 60 to cushion the upward swinging movement of focusing plate 65 and determine its upper inclined supported position relative to copy plate 60. Pin 72 is shown as having a cap mounted on the upper end thereof to provide the flange against which spring 73 abuts and also to provide a holder for a ball bearing to reduce friction in the engagement of the pin structure with the underface of copy-holder plate 60.

Means is provided for normally holding shaft 69 engaged in the slotted ends of arms 70. For this purpose, collar 75 is mounted in the central portion of shaft 69 against rotation thereon and carries arm 76 extending laterally therefrom and having bifurcated head 77 on the free end. A tension coil spring 78 has one end detachably secured in an opening formed in one side portion of copy table frame 55 as shown in Figs. 2 and 5 at 79, while the opposite end is secured to the head of screw 80 having tensioning head 81 threaded thereon for manual adjustment.

Screw 80 and tensioning head 81 are arranged so that screw 80 will engage in the bifurcation in head 77 on the end of arm 76, while one end of tensioning head 81 will seat in a depressed portion formed in head 77 adjacent the bifurcation to normally pivotally connect these parts. By operating tensioning head 81 in threaded relation on screw 80 to tension spring 78, the desired amount of tension can be obtained for normally retaining focusing plate 65 and frame 66 pivotally engaged in arms 70 against accidental detachment from the slotted ends thereof, and also, for normally elevating flange 66 with plate 65 to the position shown in Fig. 2 where the tension of spring 78 will be balanced by the tension of spring 73 and determine the raised position of the focusing plate.

This raised position of the focusing plate provides for manual insertion and removal of sheets from copy plate 60 in successive photographing operations. When a photograph is to be made with the focusing plate mounted in frame 66, frame 66 is moved down to bring focusing plate 65 into engagement with the upper surface of the sheet or card to be photographed after it has been inserted in position on copy plate 60 against the positioning pins. Focusing plate 65 thereby compresses the sheet against the top surface of copy plate 60 to smooth out all wrinkles and bulges in the sheet and bring all portions of the surface of the sheet to be photographed into full and proper focus with the lens of the camera.

A latch is provided to retain focusing plate holder 66 in its lowered position during the photographing operation. This latch mechanism includes a keeper 82 mounted on one side of frame 66 near one free corner thereof, as shown in Figs. 2 and 15, and a slidable latch member 83 mounted on the corner portion and at one side of copy plate 60 on side flange 61 thereof. This latch construction is preferably formed of sheet metal. Latch member 83 is provided with a central slotted portion to receive retaining and guide screws 84 in spaced parallel relation. Retaining and guide screws 84 are mounted in flange 61 on one side of copy plate 60, as illustrated in Figs. 2 and 15, and also secure latch retaining plate 85 against the outside face of latch 83. A tension spring 86 connected to latch 83 and anchored to plate 85, normally holds the latch 83 in position to cooperate with keeper 82 for holding focusing plate frame 66 in the lowered position with focusing plate 65 in focusing position.

Keeper 82 and latch 83 are formed with inclined end portions for camming latch 83 to one side of keeper 82 as frame 66 is manually moved to the lowered position. As soon as frame 66 reaches the lowered position as shown in Fig. 15, spring 86 moves latch 83 into latching cooperation with keeper 82 to retain frame 66 in the lowered position with focusing plate 65 in focusing position. A finger piece 87 on the end of latch 83 is easily accessible to slide latch 83 to disengage it from latching operation with keeper 82 for releasing frame 66 so that coil spring 78 can operate the frame to move it to the elevated and inclined position shown in Fig. 2 in the manner as above described.

In making photographic copies of documents and from single discrete sheets of paper or from discrete cards, the copyholder equipped as above described will be used and operated so that copy plate 60 will be vertically adjusted by operating main focusing screws 9 to bring the copy plate into proper position to focus the surface of single sheets supported thereon with the desired enlargement or reduction of the document. The supplemental carrier is adjusted to position copy plate 60 within the focus of the camera so that the document to be photographed will be positioned on the sensitized copy material either centrally or in any other desired relation. Frame 55 may also be adjusted at right angles to the adjustment of supplemental carrier 32 in connection with this positioning of the copy. When these adjustments are complete set screw 57 will be operated to lock frame 55 in position while main and supplemental carriers 25 and 32 will normally remain in position after adjustment.

Supporting frame 41 will normally remain at the bottom of its limit of movement as illustrated in Fig. 2, handle 50 being removed in order to prevent accidental operation of this frame, if desired. Then, documents with the focusing plate and frame 66 in the position shown in Fig. 2 may be manually fed into position on top of copy plate 60 with the edges engaging the positioning pins thereon. Frame 66 is then moved downwardly until keeper 82 is latched in latch member 83 when the camera mechanism is operated to take the picture of the document. Latch 83 may then be subsequently manually moved to release position to allow frame 66 to again assume the position of Fig. 2 when the document is removed and another one placed in position for photographing, and the operation repeated.

When it is desired to photograph the pages of books, focusing plate 65 and frame 66 is removed from its mounting on copy plate 60. This removal is obtained by manually pulling tensioning head 81 to disengage it from the notch or socket in head 77. Screw 80 is then disengaged from the bifurcated end of the head. Frame 66 with arms 68 and shaft 69 may then be removed from copy plate 60 by lifting the same away from copy plate 60 to disengage shaft 69 from the slotted ends of arms 70. Spring 78 and screw 80, with tensioning head 81, may be allowed to hang down on its mounting on frame 55 or may be disengaged from frame 55 by removing spring 78 from its connection with said frame at 79.

After the focusing plate is removed from copy plate 60 as above described, it may be removed from frame 66. For convenience in operation, however, a duplicate focusing plate 65 may be employed, if desired, for use in connection with the photographing of the pages of a book.

Figure 7:
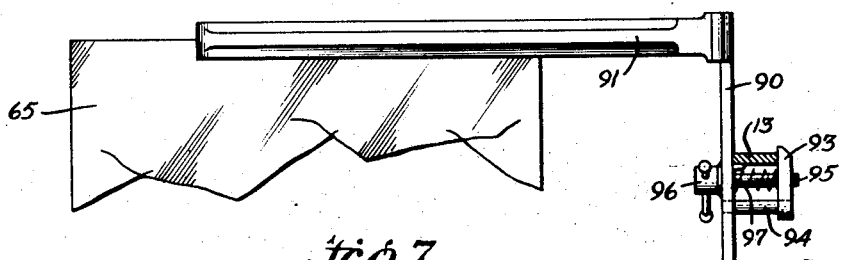
Fig. 7 is a fragmentary cross section taken on line 7—7 of Fig. 6.

Focusing plate 65 upon removal from frame 66 is applied to another frame structure in photographing book pages. This frame structure is shown in Figs. 3, 6 and 7. It has a cross bar 90 carrying focusing plate supporting arms 91, at the free ends thereof, in spaced parallel relation. Arms 91 are formed at the bottom edges with seats to receive the side edges of focusing plate 65 retained in said seats by strips 92 suitably secured to arms 91.

Cross bar 90 carries a pair of screw clamps each having a clamping dog 93 mounted for sliding movement on pin 94 carried by cross bar 90. Clamp operating screw 95 is rotatably mounted in cross bar 90 and has threaded engagement at one end with clamping dog 93 and at the opposite end carries the manual operating handle member 96. A compression spring 97 extends between clamping dog 93 and cross bar 90 to normally move clamping dog 93 outwardly away from cross bar 90.

With the pair of clamping members as just described, mounted on cross bar 90 and arranged as shown in the drawings, focusing plate 65 is then mounted with cross bar 90 engaged against the edges of vertical tracks 13 with the focusing plate positioned over copy plate 60. Clamping dogs 93 will be engaged with the opposite edges of vertical tracks 13 in the manner illustrated in Fig. 7, for example, and operating handles 96 will be manually operated to draw clamping dogs 93 into tight clamping engagement to clamp vertical tracks 13 between clamping dogs 93 and cross bar 90 and rigidly support focusing plate 65 on the vertical tracks. This provides a mounting for focusing plate 65 to facilitate the convenient photography of the pages of a book.

In photographing book pages, focusing plate 65 when carried by cross bar 90 and arms 91 is positioned on vertical tracks 13 and adjusted so that the clamping members will allow vertical sliding movement. The book to be photographed is placed on copy plate 60 and the focusing plate allowed to rest on top of the first pages to be photographed.

Copy plate 60 is then adjusted vertically by the operation of main focusing screws 9 in the manner above described to position the book pages with focusing plate 65 in the proper focused position. Supplemental carrier 32 is then adjusted, together with carrier 55. When the book pages are in proper position to produce the desired photographic image thereof, the clamps on cross bar 90 are operated, in the manner above described, to clamp focusing plate 65 in position on vertical tracks 13. Main focusing screws 9 are then operated to move copy plate 60 downwardly below focusing plate 65 into a position as indicated in Fig. 1.

To photograph a book in the desired position on copy plate 60, handle 50 is operated to slide supporting frame 41 upwardly on supplemental carrier 32 to press the pages of the book against the underface of focusing plate 65. The supporting frame is held in the upper position manually through the operation of handle 50 while the camera is operated to photograph the book pages. Handle 50 is then operated to allow supporting frame 41 to move to its normal lowered position as indicated in Fig. 1. Then the book may be removed from copy plate 60 or the pages turned in a convenient manner for the next photographing operation which will require the operation of handle 50 to raise copy plate 60 upwardly until the pages engage the underface of focusing plate 65. The upper position is illustrated in Figs. 3 and 6, showing supporting frame 41 moved upwardly in supplemental carrier 32. This illustrates one position for photographing a book assuming that the book occupies the space between focusing plate 65 and copy plate 60.

Vertical tracks 13 may have gauge marks applied thereon for registering vertical adjustment of copy plate 60 so that with the various scales for registering the positions of adjustment as herein described, the copy plate can be readily and quickly adjusted to obtain the desired positioning thereof for photographing book pages, as well as discrete documents, with the desired enlargement or reduction of the document in the photographic image thereof. The construction and arrangement of the carriers and supporting frame for copy plate 60, as well as the frames for mounting focusing plate 65 facilitates rapid operation in photographing discrete documents because these parts may be quickly positioned to hold a document in focusing position, and then also operated, for substantially rapid manual feeding of the documents into photographic position with the taking of the photograph and the removal of the document in successive order.

It will be understood from the above description that the vertical rails form a stationary supporting means for the remainder of the copyholder construction. The main and supplemental carriers with the two frames carrying the copy plate and supported by the supplemental carrier, provide a means mounted on the vertical tracks for supporting the copy plate for adjustment in three directions. The frames carrying the focusing plate provide a means for selectively mounting the focusing plate in either of two positions with respect to the copy plate. In one position the focusing plate is mounted in the frame that supports it in pivotal relation on the copy plate. In the other selective position for mounting the focusing plate, the frame structure supports it in adjusted position on the vertical tracks, as described.

The invention claimed is:

1. A copyholder for a document photographing camera having a base and a housing thereon, comprising a pair of spaced parallel rails connected to said base and housing at opposite ends, a copy plate, means suspending said copy plate from said rails for adjustment in three directions, means providing limited movement of said copy plate back and forth between two spaced parallel positions in any position of adjustment of said first-mentioned means, a focusing plate, and means for selectively supporting said focusing plate on said rails and on said copy plate whereby said focusing plate and copy plate cooperate for book page photography when said focusing plate is mounted on said rails and to facilitate discrete document photography when said focusing plate is mounted on said copy plate.

2. A copyholder for a document photographing camera comprising stationary supporting means attached to the camera, a copy plate, means suspending said copy plate from said stationary supporting means for adjustment relative thereto in three directions, means for selectively supporting said focusing plate on said copy plate for cooperation therewith in holding discrete sheets in focus with the camera, and for supporting said focusing plate on said stationary supporting means for cooperation with said copy plate in holding book pages in focus, and means providing for movement of said copy plate back and forth between two spaced positions in any adjustment of said copy plate by said second-mentioned means, one of said positions supporting copy in focus.

3. A copyholder for a document photographing camera comprising stationary supporting means attached to the camera, a copy plate, means suspending said copy plate from said stationary supporting means for adjustment relative thereto in three directions, a focusing plate, and means for selectively supporting said focusing plate on said copy plate for cooperation therewith in holding discrete sheets in focus with the camera, and for supporting said focusing plate on said stationary supporting means for cooperation with said copy plate in holding book pages in focus.

4. A copyholder for a document photographing camera comprising stationary supporting means attached to the camera, a copy plate, a main carrier adjustably mounted on said stationary supporting means, means mounting said copy plate on said main carrier for adjustment in two directions in the same plane, said adjustment by said means being in a plane at right angles to the plane of adjustment of said carrier, a focusing plate, and means for selectively supporting said focusing plate on said copy plate for cooperation to hold discrete sheets in focus, and for alternately supporting said focusing plate on said stationary supporting means for cooperation with said copy plate in holding book pages in focus.

5. A copyholder for a document photographing camera comprising stationary supporting means attached to the camera, a copy plate, a main carrier adjustably mounted on said stationary supporting means for movement in one direction, a supplemental carrier mounted on said main carrier for movement thereon in a plane at right angles to the movement of said main carrier on said stationary supporting means, a supporting frame mounted on said supplemental carrier and means for adjustably mounting said copy plate on said supporting frame for adjustment in the same plate as said supplemental carrier but at right angles thereto, a focusing plate, and means for supporting said focusing plate above said copy plate for cooperation therewith in holding documents in focus with the camera.

6. A copyholder for a document photographing camera comprising stationary supporting means attached to the camera, a copy plate, a main carrier adjustably mounted in one direction on said stationary supporting means, a supplemental carrier mounted for adjustment on said main carrier in a plane at right angles to the direction of adjustment of said main carrier, means for adjustably mounting said copy plate on said supplemental carrier, a focusing plate, and means for supporting said focusing plate above said copy plate for cooperation therewith in holding documents in focus with the camera.

7. A copyholder for a document photographing camera comprising stationary supporting means attached to the camera, a main carrier mounted for adjustment in one direction on said stationary supporting means, a supplemental carrier adjustably mounted on said main carrier for adjustment in a direction at right angles to the direction of adjustment of said main carrier, a copy plate, means for mounting said copy plate on said supplemental carrier for manual movement back and forth, said copy plate being also adjustable on said means in a direction at right angles to the adjustment of said main and supplemental carrier, a focusing plate, means for supporting said focusing plate in one position on said copy plate for cooperation therewith in holding discrete sheets in focus with the camera, and means for selectively supporting said focusing plate in another position on said stationary supporting means for cooperation with said copy plate in holding book pages in focus.

8. A copyholder for a document photographing camera comprising stationary supporting means attached to the camera, a copy plate, main and supplemental carriers, the main carrier mounted for movement on said stationary supporting means and the supplemental carrier mounted for movement on said main carrier for adjusting one of said carriers in two directions relative to said camera, means mounting said copy plate on said second-mentioned carrier for adjustment in a plane at right angles to the planes of the adjustment of said supplemental and main carriers, means providing for movement of said copy plate back and forth between two spaced parallel positions in any adjustment of said copy plate by said last mentioned means and by said main and supplemental carriers, a focusing plate, means for adjustably mounting said focusing plate on said stationary supporting means for cooperation with said copy plate in holding book pages in a position to be photographed by said camera in one of said spaced positions of said copy plate.

9. A copyholder for a document photographing camera comprising stationary supporting means attached to the camera, a main carrier adjustably mounted in one direction on said stationary supporting means, a supplemental carrier mounted for sliding movement on said main carrier for adjustment in a plane at right angles to the plane of adjustment of said main carrier on said stationary supporting means, a supporting frame slidably mounted for back and forth movement between two positions on said supplemental carrier, a copy plate, a copy table frame carrying said copy plate and slidably mounted on said supporting frame for movement at right angles to the directions of adjustment of said main and supplemental carriers, and means for manually moving said supporting frame back and forth on said supplemental carrier between said two positions, and a focusing plate carried by said stationary supporting means for cooperation with said copy plate in one of said positions of movement thereof to hold material to be copied against said copy plate in focus with said camera.

10. A copyholder for a document photographing camera comprising stationary supporting means attached to the camera, a main carrier mounted for adjustment in one plane on said stationary supporting means, a supplemental carrier mounted on said main carrier for adjustment in a plane at right angles to the adjustable mounting of said main carrier, a copy plate, means for mounting the copy plate on said supplemental carrier for adjustment in a direction at right angles to the adjustment of said main and supplemental carriers, whereby said carriers and said copy plate supporting means may be adjusted to position said copy plate in a desired position for holding documents in focus for photographing by said camera a focusing plate, and means for adjustably mounting said focusing plate on said supporting means independently of said copy plate.

11. A copyholder for a document photographing camera comprising stationary supporting means attached to the camera, a copy plate, means suspending said copy plate from said stationary supporting means for adjustment relative thereto in three directions, a focusing plate, a frame for mounting said focusing plate, and cooperating parts on said focusing plate frame and supporting means, for detachably and adjustably mounting said focusing plate on said supporting means independent of said copy plate.

12. A copyholder for a document photographing camera comprising a copy plate, means mounting said copy plate on said camera for adjustment relative thereto in three directions, a focusing plate, a frame carrying said focusing plate, a pair of slotted arms mounted on said copy plate, a pair of arms mounted on said frame carrying a shaft having bearing engagement in the slotted portions of the arms on said copy plate for pivotally mounting said frame thereon, and resilient means for normally retaining said copy plate in pivotally engaged relation in the slotted portions of said arms on said copy plate and for normally holding said focusing plate in spaced relation relative to said copy plate.

13. A copyholder for a document photographing camera having a base and a housing thereon, comprising a pair of spaced parallel rails connected to said base and housing at opposite ends, a main carrier movably mounted on said rails, and adjusting mechanism mounted on said housing and connected to said carrier operable for moving said carrier on said rails and retaining it in any desired position of adjustment on said rails, a supplemental carrier slidably mounted on said main carrier and having means for adjusting said supplemental carrier and holding it in adjusted position relative to said main carrier, a supporting frame mounted on said supplemental carrier, a copy plate, and means slidably mounting said copy plate on said supporting frame for adjustment at right angles to the adjustment of said main and supplemental carriers and for retaining said copy plate in adjusted position thereon.

14. A copyholder for a document photographing camera comprising a copy plate, means mounting said copy plate on said camera for adjustment relative thereto in three directions, a focusing plate, a frame carrying said focusing plate, a pair of slotted arms mounted on said copy plate, a pair of arms mounted on said frame carrying a shaft having bearing engagement in the slotted portions of the arms on said copy plate for pivotally mounting said frame thereon, resilient means for normally retaining said copy plate in pivotally engaged relation in the slotted portions of said arms on said copy plate and for normally holding said focusing plate in spaced relation relative to said copy plate, and cooperating resiliently projected means carried by said shaft for engaging said copy plate and cushioning said frame in movement thereof by said first-mentioned resilient means.

FRANK M. PICKETT.